US006203915B1

(12) United States Patent
Prissok et al.

(10) Patent No.: US 6,203,915 B1
(45) Date of Patent: Mar. 20, 2001

(54) LAMINATE

(75) Inventors: Frank Prissok, Lanförde; Leonidas Kiriazis, Münster, both of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/029,283

(22) PCT Filed: Aug. 27, 1996

(86) PCT No.: PCT/EP96/03771

§ 371 Date: Feb. 27, 1998

§ 102(e) Date: Feb. 27, 1998

(87) PCT Pub. No.: WO97/07974

PCT Pub. Date: Mar. 6, 1997

(30) Foreign Application Priority Data

Aug. 28, 1995 (DE) ............................................... 195 31 586

(51) Int. Cl.[7] .............................. B32B 7/12; B32B 27/40; C09J 175/06
(52) U.S. Cl. ..................................... 428/423.3; 156/330.9; 156/331.4; 156/331.7; 428/423.7; 428/425.1; 428/428.8
(58) Field of Search ............................... 428/423.3, 423.7, 428/425.1, 425.8; 156/330.9, 331.4, 331.7

(56) References Cited

U.S. PATENT DOCUMENTS

| 4,010,311 | 3/1977 | Lewis et al. | 428/412 |
|---|---|---|---|
| 4,039,719 | 8/1977 | Matsuda et al. | 428/339 |
| 4,206,299 | 6/1980 | Yamazaki et al. | 528/288 |
| 4,686,125 | 8/1987 | Johnston et al. | 383/116 |
| 4,859,523 | 8/1989 | Endoh et al. | 428/215 |
| 5,162,457 | * 11/1992 | Hansel et al. | 525/454 |
| 5,262,242 | * 11/1993 | Tomiyama et al. | 428/423.1 |

FOREIGN PATENT DOCUMENTS

| 0 421 154 A1 | 4/1991 | (EP) . |
|---|---|---|
| 0 484 761 A1 | 5/1992 | (EP) . |
| 0 574 802 A1 | 12/1993 | (EP) . |
| 7-097557 | 4/1995 | (JP) . |
| 1193196 | 11/1985 | (SU) . |

* cited by examiner

Primary Examiner—D. S. Nakarani

(57) ABSTRACT

The invention concerns a laminate comprising: a) a plastics foil; b) an adhesion-promoting layer based on polyurethane containing one or a plurality of polyester diols with a molecular weight of between 600 and 1200, preferably between 800 and 1000; c) optionally a further plastics foil; d) optionally a further polyurethane-based adhesion-promoting layer, e) optionally a varnish layer, f) optionally a filler layer; and g) a carrier material layer, preferably of plastics, wood or metal.

16 Claims, No Drawings

LAMINATE

The present invention relates to a laminate, to a process for its preparation and to its use.

BACKGROUND OF THE INVENTION

EP-A-374 551 discloses coated substrates suitable for producing add-on parts for automobile bodies. The coated substrates described consist of metal panels coated with at least one paint film or of composite materials whose surface layer consists of the painted metal parts. P 4424290.9 discloses substrates coated with two or more layers. These substrates are formed and processed with or without the aid of further materials. In this way it is possible to produce add-on parts for vehicle bodies.

According to this prior art, therefore, a metal panel is coated with a filler onto which a paint is then applied. The metal panel is subsequently cut and formed. In some cases, the form is punched directly from the panel.

A problem with is technique is that the painted metal must be bent, in some cases by up to 180°. It is therefore necessary for the coating material applied to be sufficiently flexible that at the broken edge no cracks are formed which might be a source of corrosion.

The flexibly formulated coating materials, however, are so soft that their surface can readily be damaged by sharp objects.

The object of the present invention was, accordingly, to provide a laminate which no longer has the disadvantages set out above.

SUMMARY OF THE INVENTION

This object is achieved by a laminate consisting of
a) a plastic film,
b) an adhesion-promoting layer based on polyurethane consisting of one or more polyester- or polyetherdiols having a molecular weight of from 500 to 2500, preferably from 800 to 1000,
c) if desired, a further plastic film,
d) if desired, a layer of a coating material,
e) if desired, a filler layer, and
f) a layer of support material, preferably of plastic, wood or metal.

DETAILED DESCRIPTION OF THE PREFERRED EMBODIMENT

Suitable materials for the plastic films a) and c) of the invention are preferably thermoplastics. It is possible, for example, to employ films of polyolefin, polyamide, polyurethane, polyester, polyacrylate, polycarbonate or a mixture of these polymeric substances. Particular preference is given in accordance with the invention to polyurethanes and polyesters.

A suitable polyurethane film is preferably thermoplastic polyurethane, stabilized against ultraviolet radiation, based on diisocyanates, diols as chain extenders, polytetrahydrofuran or linear polyesterdiols.

Thermoplastic polyurethanes of this kind can be prepared, for example, by the belt method or extruder method, by reaction of
a) organic, preferably aliphatic, cycloaliphatic or, in particular, aromatic diisocyanates,
b) polyhydroxy compounds having molecular weights of from 500 to 3000 and
c) chain extenders having molecular weights of from 60 to 400,
d) if desired in the presence of catalysts,
e) auxiliaries and/or additives.

The starting materials (a) to (c), catalysts (d), auxiliaries and additives (e) which can be used for this purpose are described in more detail below:
a) Suitable organic diisocyanates (a) are preferably aliphatic, cycloaliphatic and, in particular, aromatic diisocyanates. Specific examples that may be mentioned are: aliphatic diisocyanates, such as hexamethylene 1,6-diisocyanate, methylpentamethylene 1,5-diisocyanate, 2-ethylbutylene 1,4-diisocyanate or mixtures of at least 2 of these $C_6$-alkylene diisocyanates, pentamethylene 1,5-diisocyanate and butylene 1,4-diisocyanate, cycloaliphatic diisocyanates, such as isophorone diisocyanate, 1,4-cyclohexane diisocyanate, 1-methyl-2,4- and -2,6-cyclohexane diisocyanate and the corresponding isomer mixtures, 4,4'-, 2,4'-and 2,2'-dicyclohexylmethyl diisocyanate and the corresponding isomer mixtures, and preferably aromatic diisocyanates, such as 2,4-tolylene diisocyanate, mixtures of 2,4- and 2,6-tolylene diisocyanate, 4,4'-, 2,4'- and 2,2'-diphenylmethane diisocyanate, mixtures of 2,4'-and 4,4'-diphenylmethane diisocyanate, urethane-modified, liquid 1,2-(4,4'- and/or 2,4'-diisocyanatodiphenyl)ethane and 1,5-naphthylene diisocyanate. It is preferred to use hexamethylene 1,6-diisocyanate, 4,4'-dicyclohexylmethane diisocyanate, isophorone diisocyanate, diphenylmethane diisocyanate isomer mixtures with a 4,4'-diphenylmethane diisocyanate content of greater than 96% by weight, and especially 4,4'-diphenylmethane diisocyanate.
b) Suitable polyhydroxy compounds (b) of relatively high molecular mass, having molecular weights of from 500 to 3000, are preferably polyetherols and polyesterols. Also suitable, however, are hydroxyl-containing polymers, for example polyacetals, such as polyoxymethylenes and especially water-insoluble formals, examples being polybutanediol formal and polyhexanediol formal, and aliphatic polycarbonates, especially those of diphenyl carbonate and 1,6-hexanediol, prepared by transesterification, having the abovementioned molecular weights. The polyhydroxy compounds must be at least predominantly linear, i.e. of difunctional composition for the purposes of the isocyanate reaction. The polyhydroxy compounds specified can be employed as individual components or in the form of mixtures.

Suitable polyetherols can be prepared by known methods, for example by anionic polymerization with alkali metal hydroxides, such as sodium or potassium hydroxide, or alkali metal alcoholates, such as sodium methylate, sodium or potassium ethylate or potassium isopropylate as catalysts or by cationic polymerization with Lewis acids, such as antimony pentachloride, boron fluoride etherate, etc., or bleaching earth as catalysts, of one or more alkylene oxides having 2 to 4 carbon atoms in the alkylene radical and, if desired, a starter molecule containing 2 reactive hydrogen atoms in bonded form.

Examples of alkylene oxides that may be mentioned are: ethylene oxide, 1,2-propylene oxide, tetrahydrofuran, 1,2- and 2,3-butylene oxide. Employed preferably are ethylene oxide and mixtures of 1,2-propylene oxide and ethylene oxide. The alkylene oxides can be used individually, alternately in succession or as a mixtures. Examples of suitable starter molecules are: water, amino alcohols, such as N-alkyl-dialkanolamines, an example being N-methyl-diethanolamine, and diols, for example alkanediols or dialkylene glycols having 2 to 12 C atoms, preferably 2 to 6 C atoms, such as ethanediol, 1,3-propanediol, 1,4-butanediol and 1,6-hexanediol. It is also possible if desired to employ mixtures of starter molecules. Further suitable polyetherols are the hydroxyl-containing polymerization products of tetrahydrofuran (polyoxytetramethylene glycols).

Preference is given to the use of polyetherols of 1,2-propylene oxide and ethylene oxide in which more than 50%, preferably from 60 to 80% of the OH groups are primary hydroxyl groups and in which at least some of the ethylene oxide is arranged as a terminal block, and especially polyoxytetramethylene glycols.

Such polyetherols can be obtained by polymerizing first the 1,2-propylene oxide and then, subsequently, the ethylene oxide onto the starter molecule, or first of all copolymerizing all of the 1,2-propylene oxide in a mixture with some of the ethylene oxide, and subsequently polymerizing on the remainder of the ethylene oxide, or, in a stepwise procedure, polymerizing first some of the ethylene oxide, then all of the 1,2-propylene oxide and then the remainder of the ethylene oxide onto the starter molecule.

The essentially linear polyetherols possess molecular weights of from 500 to 3000, preferably from 500 to 2500 and, in particular, from 800 to 1000. They can be employed both individually and in the form of mixtures with one another.

Suitable polyesterols can be prepared, for example, from dicarboxylic acids having 2 to 12 carbon atoms, preferably 4 to 8 carbon atoms, and polyhydric alcohols. Examples of suitable dicarboxylic acids are: aliphatic dicarboxylic acids, such as succinic acid, glutaric acid, suberic acid, azelaic acid, sebacic acid and, preferably, adipic acid, and aromatic dicarboxylic acids, such as phthalic acid, isophthalic acid and terephthalic acid. The dicarboxylic acids can be used individually or as mixtures, for example in the form of a succinic, glutaric and adipic acid mixture.

Likewise employable are mixtures of aromatic and aliphatic dicarboxylic acids. To prepare the polyesterols it may, if appropriate, be advantageous to use, instead of the dicarboxylic acids, the corresponding dicarboxylic acid derivatives, such as dicarboxylic esters with 1 to 4 carbon atoms in the alcohol residue, dicarboxylic anhydrides or dicarbonyl chlorides. Examples of polyhydric alcohols are alkanediols having 2 to 10, preferably 2 to 6 carbon atoms, such as ethanediol, 1,3-propanediol, 1,4-butanediol, 1,5-pentanediol, 1,6-hexanediol, 1,10-decanediol, 2,2-dimethyl-1,3-propanediol, 1,2-propanediol and dialkylene ether glycols, such as diethylene glycol and dipropylene glycol. Depending on the desired properties it is possible to use the polyhydric alcohols alone or, if appropriate, in mixtures with one another.

Also suitable are esters of carbonic acid with the above-mentioned diols, especially those having 4 to 6 carbon atoms, such as 1,4-butanediol and/or 1,6-hexanediol, condensation products of α-hydroxy carboxylic acids, for example α-hydroxycaproic acid, and preferably polymerization products of lactones, for example substituted or unsubstituted ε-caprolactones.

Preferably used as polyesterols are alkanediol polyadipates having 2 to 6 carbon atoms in the alkylene radical, such as ethanediol polyadipates, 1,6-hexanediol/1,4-butanediol polyadipates, ethanediol/1,4-butanediol polyadipates, 1,6-hexanediol/neopentyl glycol polyadipates, polycaprolactones and, in particular, 1,4-butanediol polyadipates.

The polyesterols possess molecular weights (weight average) of from 500 to 3000, preferably from 800 to 1000.

c) Suitable chain extenders (c) having molecular weights of from 60 to 400, preferably from 60 to 300, are preferably alkanediols having 2 to 12 carbon atoms, preferably having 2, 4 or 6 carbon atoms, such as ethanediol, 1,6-hexanediol and, in particular, 1,4-butanediol, and dialkylene ether glycols, such as diethylene glycol and dipropylene glycol. Also suitable, however, are diesters of terephthalic acid with alkanediols having 2 to 4 carbon atoms, such as terephthalic acid bisethanediol or bis-1,4-butanediol, hydroxyalkyl ethers of hydroquinone, such as 1,4-di(β-hydroxyethyl)hydroquinone, (cyclo)aliphatic diamines, such as 4,4'-diaminodicyclohexylmethane, 3,3'-dimethyl-4,4'-diaminodicyclohexylmethane, isophoronediamine, ethylenediamine, 1,2-, 1,3-propylenediamine, N-methyl-1,3-propylenediamine, N,N'-dimethylethylenediamine and aromatic diamines, such as 2,4- and 2,6-tolylenediamine, 3,5-diethyl-2,4- and -2,6-tolylenediamine and primary, ortho-di-, -tri- and/or -tetraalkyl-substituted 4,4'-diaminodiphenylmethanes.

Chain extenders preferably used are alkanediols having 2 to 6 C atoms in the alkylene radical, especially 1,4-butanediol, and/or dialkylene glycols having 4 to 8 carbon atoms.

To establish hardness and melting point of the thermoplastic polyurethanes it is possible to vary the structural components (b) and (c) within relatively wide molar proportions. Molar ratios of polyhydroxy compounds (b) to chain extenders (c) of from 1:1 to 1:12, in particular from 1:1.8 to 1:6.4, have been found suitable, the hardness and the melting point of the thermoplastic polyurethanes increasing as the content of diols rises.

To prepare the thermoplastic polyurethanes, the structural components (a), (b) and (c) are reacted in the presence of optional catalysts (d), auxiliaries and/or additives (e) in amounts such that the ratio of equivalents of NCO groups of the diisocyanates (a) to the sum of the hydroxyl groups or hydroxyl and amino groups of components (b) and (c) is from 1:0.85 to 1.25, preferably from 1:0.95 to 1:1.05 and, in particular, from 1:0.98 to 1.02.

d) Suitable catalysts, which accelerate in particular the reaction between the NCO groups of the diisocyanates (a) and the hydroxyl groups of the structural components (b) and (c), are the tertiary amines which are customary and known from the prior art, such as triethylamine, dimethylcyclohexylamine, N-methylmorpholine, N,N'-dimethylpiperazine, 2-(dimethylaminoethoxy)-ethanol, diazabicyclo[2.2.2]octane and the like, and also, in particular, organometallic compounds such as titanates, iron compounds such as iron(III) acetylacetonate, tin compounds, for example tin diacetate, tin dioctoate, tin dilaurate or the tin dialkyl salts of aliphatic carboxylic acids, such as dibutyltin diacetate, dibutyltin dilaurate or the like. The catalysts are customarily employed in amounts of from 0.002 to 0.1 parts per 100 parts of polyhydroxy compound (b).

e) In addition to catalysts it is also possible to incorporate auxiliaries and/or additives (e) into the structural components (a) to (c). Examples that may be mentioned are lubricants, inhibitors, stabilizers against hydrolysis, light, heat or discoloration, dyes, pigments, inorganic and/or organic fillers, reinforcing agents and plasticizers.

Further details on the abovementioned auxiliaries and additives can be found in the technical literature, for example in the monograph by J. H. Saunders and K. C. Frisch "High Polymers", Volume XVI, Polyurethanes, Part 1 and 2, Interscience Publishers 1962 and 1969, from the abovementioned Kunststoff-Handbuch, Volume XII, Polyurethanes, or from DE-A 29 01 774.

As already set out, the thermoplastic polyurethane can be prepared preferably by the belt method. The detailed procedure in the case of the belt method is as follows:

The structural components (a) to (c) and, if desired, (d) and/or (e) are mixed continuously at temperatures above the melting point of the structural components (a) to (c) with the aid of a mixing head. The reaction mixture is applied to a carrier, preferably a conveyor belt, and is guided through a thermally conditioned zone. The reaction temperature in the thermally conditioned zone is from 60 to 200° C., preferably from 100 to 180° C. and the residence time is from 0.05 to 0.5 hours, preferably from 0.1 to 0.3 hours. After the end of reaction, the thermoplastic polyurethane is allowed to cool and is comminuted or granulated subsequently.

In the extruder method, the structural components (a) to (c) and, if desired, (d) and (e), individually or as a mixture, are introduced into the extruder, reacted at temperatures from 100 to 250° C., preferably from 140 to 220° C., and the thermoplastic polyurethane obtained is extruded, cooled and granulated.

Thermoplastic polyurethanes which find preferred application are those having a Shore A hardness of from 60 to 98, preferably from 70 to 90, which are prepared by reacting polyoxytetramethylene glycol or, in particular, alkanediol polyadipates having 2 to 6 carbon atoms in the alkylene radical, linear aliphatic and/or cycloaliphatic diisocyanates, for example hexamethylene 1,6-diisocyanate or 4,4-dicyclohexylmethane cyanate, and preferably aromatic diisocyanates and/or, in particular, 4,4'-diphenylmethane diisocyanate and 1,4-butanediol in a ratio of equivalents of NCO to OH groups of 1:0.95 to 1.10.

In order to stabilize it against heat and oxidation, antioxidants, preferably sterically hindered phenols, are added to the thermoplastic polyurethane in accordance with the invention. In order to improve the protection against ultraviolet radiation still further, it is possible to mix special UV filter substances into the thermoplastic polyurethane. Benzotriazoles are preferably used for this purpose.

To protect against hydrolytic degradation, hydrolysis stabilizers such as carbodiimides, for example, are added to the polyurethanes. The thermoplastic polyurethanes may furthermore be mixed with substances which act as free-radical scavengers. Sterically hindered amines or epoxide compounds are particularly suitable for this purpose.

The hardness of the thermoplastic polyurethane employed in accordance with the invention depends on the area of application. In principle, the Shore hardness lies between 75 A and 85 D. For the area of adhesion promoters, 60 A to 98 A, especially 70 to 90 A, are appropriate.

Suitable thermoplastic polyesters are plastics in the form of copolyesters, polyester elastomers, polymer mixtures and aromatic polyesters (polyarylates). Particularly preferred in accordance with the invention are polyesters from the group of the polyalkylene terephthalates, of the formula:

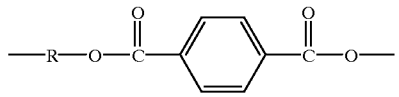

I: R = (CH$_2$)$_2$
II: R = (CH$_2$)$_4$

The industrially most important representative of these thermoplastic polymers that can be employed in accordance with the invention is polyethylene terephthalate, of the formula I. The industrial preparation of this substance takes place 1. by transesterifying dimethyl terephthalate with ethylene glycol with elimination of methanol to form bis(2-hydroxyethyl) terephthalate and the polycondensation thereof, accompanied by the release of ethylene glycol, or 2. by direct polycondensation of ethylene glycol and terephthalic acid.

The polyethylene terephthalate films are products of high strength, stiffness and dimensional stability, good slip and wear properties, and high chemical resistance.

The resulting copolyesters possess high transparency, toughness, dimensional stability and favorable long-term durability, slip, wear and stress corrosion cracking properties.

Thermoplastic polyalkylene terephthalates that are also preferred in accordance with the invention are the polybutylene terephthalates of the formula II. Such polyesters are prepared industrially by transesterifying dimethyl terephthalate with 1,4-butanediol and then polycondensing the resulting bis(4-hydroxybutyl)terephthalic ester in the presence of titanates, with elimination of 1,4-butanediol.

Characteristics of the polybutylene terephthalate films are high strength, stiffness, hardness, toughness at low temperatures and heat distortion resistance, good slip and wear properties, low water absorption, high dimensional stability and stability to organic solvents, fuels, oils and fats.

Polybutylene terephthalates have a density of from about 1.3 to 1.5 g/cm$^3$, a glass transition temperature of about 25° C. and a softening point of about 230° C. The polybutylene terephthalate films are resistant to stress corrosion cracking and can be processed by injection molding, extrusion and thermoforming. In physiological terms, the polybutylene terephthalates are classified as unobjectionable.

The polyester or polyurethane films described therefore possess the necessary flexibility and hardness, so that bending by 180° can be performed without cracking, but at the same time sufficient protection against damage to the surface by sharp objects is ensured.

The plastic films employed have a thickness of 10 to 500 μm, preferably from 40 to 150 μm, and may include dyes and/or pigments.

In accordance with the prior art it was a problem when applying the films to achieve sufficient adhesion. In accordance with the invention this is achieved by an adhesion promoter based on polyurethanes which consists of one or more polyesterdiols having a molecular weight of from 600 to 1200, preferably from 800 to 1000. Suitable polyesterdiols are polybutanediol adipates, polyethylene glycol or mixtures hereof.

As isocyanate components the polyurethane adhesion promoters comprise organic diisocyanates (a) . Suitable organic diisocyanates (a) are preferably aliphatic, cycloaliphatic and, in particular, aromatic diisocyanates.

Specific examples that may be mentioned are: aliphatic diisocyanates, such as hexamethylene 1,6-diisocyanate, methylpentamethylene 1,5-diisocyanate, 2-ethylbutylene 1,4-diisocyanate or mixtures of at least 2 of these C$_6$-alkylene diisocyanates, pentamethylene 1,5-diisocyanate and butylene 1,4-diisocyanate, cycloaliphatic diisocyanates, such as isophorone diisocyanate, 1,4-cyclohexane diisocyanate, 1-methyl-2,4- and -2,6-cyclohexane diisocyanate and the corresponding isomer mixtures, 4,4'-, 2,4'- and 2,2'-dicyclohexylmethyl diisocyanate and the corresponding isomer mixtures, and preferably aromatic diisocyanates, such as 2,4-tolylene diisocyanate, mixtures of 2,4- and 2,6-tolylene diisocyanate, 4,4'-, 2,4'- and 2,2'-diphenylmethane diisocyanate, mixtures of 2,4'- and 4,4'-diphenylmethane diisocyanate, urethane-modified, liquid 1,2-(4,4'- and/or 2,4'-diisocyanatodiphenyl)ethane and 1,5- naphthylene diisocyanate. It is preferred to use hexamethylene 1,6-diisocyanate, 4,4'-dicyclohexylmethane diisocyanate, isophorone diisocyanate, diphenylmethane diisocyanate isomer mixtures with a 4,4'-diphenylmethane diisocyanate content of greater than 96% by weight, and especially 4,4'-diphenylmethane diisocyanate.

The adhesion promoters described can be applied to a wide variety of substrates where they bring about very good adhesion with the above-described plastic films. In accordance with the invention, therefore, the adhesion promoter can be used to join two of the above-described films or for application to substrates of wood, metal, paper or plastic.

In accordance with the invention the adhesion promoter can function as an independent layer or as a coextruded film of adhesion promoter and plastic film described above, or as an adhesion-promoting layer between two films.

The adhesion-promoting layer can comprise pigments.

In accordance with the invention the adhesion promoter is pasteurization-resistant (80° C. for 30 minutes) and sterilization-resistant (130° C. for 1 h). It is resistant to a wide variety of media, examples being water, acetic acid, lactic acid, saline solution and tomato puree. These positive properties occasion a broad scope for application in the field of domestic appliances, preserve cans, automobiles, furniture and the coating of paper and board.

The excellent adhesion-promoting properties mean that application can be made to a very wide variety of substrates. Especially in the case of use for the automotive industry, it is possible in accordance with the invention to use a metal panel which has been given a surfacer coat and/or paint coat. An equally good join can be achieved with both materials.

The surfacer coat has essentially two functions: firstly it is intended to compensate for the unevennesses in the electrodeposited primer and secondly it is intended to improve the stone-chip resistance of the overall paint system. The surfacer compositions consist essentially of a binder, a crosslinking agent, pigments and fillers and, if desired, further additives, such as crosslinking catalysts and leveling agents.

The surfacer compositions which can be employed may comprise as their binders epoxy resins, polyester resins, polyurethane resins, polyacrylate resins and alkyd resins or combinations of such resins. Crosslinking agents which the employable surfacer compositions can comprise are amino resins, such as melamine, formaldehyde resins, amines, polyisocyanates and carboxyl-containing compounds. Examples of pigments which may be present in the surfacer compositions that can be employed are titanium dioxide, phthalocyanines, iron oxides and carbon black. Fillers which the surfacer compositions can comprise are, for example, lime or barium sulfate.

When using the surfacer compositions, sufficient flexibility should be borne in mind in every case. In accordance with the invention this can be controlled by way of the degree of crosslinking.

As coating material it is possible to use any basecoat or topcoat suitable for the conventional coating of automobile bodies. Here too, however, good flexibility of the cured coating is a necessary prerequisite. Coating materials of this kind are well known to the skilled worker. They comprise essentially a polymeric binder, with or without a crosslinking agent, and also pigments or a mixture of pigments.

A topcoat or basecoat may comprise as its binder, for example, a polyester resin, a polyurethane resin or a polyacrylate resin or a mixture of such binders. As crosslinking agent the coating material can comprise an amino resin, a polyisocyanate resin, a carboxyl-containing crosslinking agent or a mixture of such crosslinking agents. Examples of pigments which can be used are titanium dioxide, phthalocyanine pigments, carbon black, iron oxide pigments, aluminum flake pigments and pearl luster pigments.

In addition to the coating materials described it is also possible to use customary clearcoats. In this case it is appropriate to assign a further pigment-containing layer or to provide the other layers of the laminate with pigments, for example the plastic film, the adhesion layer or the surfacer.

As the substrate to be coated, various materials come into consideration depending on the field of use. For the sector of the automotive industry, these are preferably carrier materials of metal or plastic. In the latter case, particular preference is given to polyesters and polyurethanes. In accordance with the invention it is likewise possible to produce laminate for furniture. In this case the substrate to be coated is a plastic, wooden panels or chipboards. The surfaces obtained are notable for excellent resistance to hard objects and to chemicals. Furthermore, the coated areas have a high gloss. Finally there is the possibility, in accordance with the invention, of obtaining textured surfaces by means of embossing rollers. In the case of use in the furniture industry it is also a great advantage that, despite the extraordinary hardness of the surface, bending by 180° is possible without causing a fracture at the edges. Even when very hard coating material is used, which itself would break, the protection afforded by the film means that the composite as such does not break. In accordance with the invention it is therefore possible to provide furniture edges with an optimum coating without the disadvantageous breaking in this area in accordance with the prior art to date.

The outstanding properties of the laminate of the invention also mean that it can be used for boards and paper. For wallpapers in particular, textured surfaces can be produced.

The present invention also relates to a process for producing the laminate of the invention. In this process, the above-described adhesion-promoting layer and then the above-described plastic film are applied to a carrier material layer, preferably of polyester, polyurethane, wood or metal. Adhesion-promoting layer and plastic film can be applied to the carrier substrate simultaneously or in succession.

In accordance with the invention, elevated temperatures and pressures are used for the application. The temperatures in accordance with the invention are from 100 to 230° C., preferably from 150 to 200° C. The pressure is from 1 to 150, preferably from 5 to 50 bar.

When used for the automotive bodies the metals to be coated are, in accordance with the invention, preferably overcoated with a surfacer coat and/or paint coat. Subsequently, paint coat and surfacer coat are cured. In accordance with the invention, however, it is also possible to cure the applied surfacer coat before painting over it.

The curing of the paint coats takes place usually by heating at temperatures from 60 to 230° C. In this case there is a reaction between the crosslinking agents and binders present in the coating materials, and three-dimensional polymeric networks are formed which give the paint surface a particularly high resistance to mechanical and chemical attack.

The paint coats can be applied, for example, by spraying, rolling and knife coating.

The described laminates of the invention on the basis of metal substrates can be rolled together. As a result, these products can be supplied and despatched in the form of rolls. Owing to the special composite with the plastic film over the adhesion-promoting layer employed in accordance with the invention, the laminates exhibit their particular advantage here too. Indeed, owing to the excellent flexibility, there can be no fracturing or other damage in the course of rolling together.

The laminates according to the invention on the basis of metal substrates are suitable for producing shaped parts, preferably for producing vehicle bodies, add-on parts for vehicle bodies, domestic appliances, examples being refrigerators, washing machines and dishwashers. In this case the laminates, which can be stored and supplied in roll form, are cut out and shaped in order to produce the shaped parts. In this mode of production the flexibility and hardness of the surfaces of the laminates again have an advantageous effect.

The invention is described in more detail below with reference to the examples.

The following films were tested as plastic films a):
A. Polyurethane films from the company Elastogran:
 1) Elastollan® 1180A to 1174D
 2) Elastollan® SP 834
 3) Elastollan® C74D (white)
B. Polyester films
 1) Ultradur® from the company BASF AG
 2) Melinex® from the company ICI
 3) Elastotec® from the company Elastogran
 4) Hostadur®
Thickness of the films: 12 to 150 µm.

As the adhesion-promoting layer, the following examples are given here:
Elastollan SP 876 (40 µm thick)
Elastollan LP 9034 (40 µm thick)

The layer c) corresponds to the layer a). The coating layers d) and e) are e.g.: coil coatings and primers which are used for coating metal for use in producing domestic appliances.

An example of the layer structure of the invention is:
a) Plastic film: PBT Ultradur B4450 from BASF AG, 20 µm thick
b) Plastic film: LP 9034 from Elastogran, 40 µm thick
c) Coil coating: CH 26-0362 from BASF L+F AG (20 µm)
d) Primer coat: CP 21-0916 from BASF L+F AG (5 µm)
e) Metal: BONDER 901620B (0.75 mm thick).

As support layer f) the following were tested:
1) Plastic: polyurethane sheets, acrylonitrile-butadiene-styrene copolymers, polypropylene etc.
2) Wood: various types of wood, plywood, veneer, paper
3) Metal: steel, iron, tinplate, aluminum.

What is claimed is:

1. A laminate comprising
 a) a plastic film,
 b) an adhesion-promoting layer comprising a polyurethane comprising one or more polyesterdiols having a molecular weight of from 500 to 2500 and selected from the group consisting of polybutanediol adipates, polyethylene glycol adipates, and mixtures thereof and
 g) a layer of support material selected from the group consisting of plastic, wood and metal, wherein the laminate can be rolled.

2. The laminate of claim 1, wherein the adhesion-promoting layer further comprises pigments.

3. The laminate of claim 1, further comprising a plastic film c) joined to the plastic film a) by the adhesion promoter b).

4. The laminate of claim 3, wherein plastic films a) and c) are pigmented.

5. The laminate of claim 3, wherein one or both of the plastic films a) and c) comprise a thermoplastic polyurethane which is stabilized against UV radiation and comprises the reaction product of diisocyanates, short-chain diols having molecular weights of from 60 to 400 as chain extenders and long-chain polyethers and/or polyesterdiols having molecular weights of from 500 to 3000.

6. The laminate of claim 5, wherein the long chain polyethers and/or polyesterdiols are selected from the group consisting of polytetrahydrofuran, linear polybutanediol adipates and mixtures thereof.

7. The laminate of claim 3, wherein plastic films a) and/or c) comprise polyesters selected from the group consisting of polyalkylene terephthalate, polybutylene terephthalate and mixtures thereof.

8. The laminate of claim 3, further comprising
 d) an additional adhesion-promoting layer, and
 f) a filler layer, wherein the filler layer is applied over the plastic film c) and the adhesion promoting layer d) adheres the plastic film c) to the filler layer f).

9. The laminate of claim 3, wherein one or more of the plastic films a) and c) are selected from the group consisting of plastic films made of polyurethane, polyester and mixtures thereof.

10. The laminate of claim 1, further comprising a coating layer e) comprising a clearcoat layer and, arranged below it, a pigment-containing paint layer, wherein said pigment-containing paint layer is applied to the plastic film a).

11. A process for producing the laminate of claim 1, which comprises applying to a layer of support material,
 a) a plastic film,
 b) an adhesion-promoting layer comprising a polyurethane comprising one or more polyesterdiols having a molecular weight of from 500 to 2500, and selected from the group consisting of polybutanediol adipates, polyethylene glycol adipates, and mixtures thereof
wherein the adhesion-promoting layer adheres the plastic film a) to the support material layer.

12. The process of claim 11, wherein the adhesion-promoting layer is applied at a pressure of from 1 to 150 bar.

13. The process of claim 12, wherein the application of the adhesion-promoting layer is carried out at a temperature of from 100 to 230°C.

14. The process of claim 12, wherein the adhesion-promoting layer is applied at a pressure of from 5 to 50 bar.

15. The process of claim 12, wherein the application of the adhesion-promoting layer is carried out at a temperature of from 150° C. to 200° C.

16. A method of applying a laminate, comprising providing a laminate comprising
 a) a plastic film,
 b) an adhesion-promoting layer comprising a polyurethane comprising one or more polyesterdiols having a molecular weight of from 500 to 2500, and selected from the group consisting of polybutanediol adipates, polyethylene glycol adipates, and mixtures thereof and
 c) a layer of support material selected from the group consisting of plastic, wood or metal, and
applying the laminate to a support material selected from the group consisting of domestic appliances, preserve cans, motor vehicle bodies, furniture, furniture parts, cardboard, paper, and wallpapers
wherein the adhesion-promoting layer adheres the plastic film a) to the support material layer c).

* * * * *